United States Patent [19]

Henderson

[11] 3,835,622

[45] Sept. 17, 1974

[54] REMOVAL OF NITROGEN OXIDES FROM CARBON BLACK PELLET DRYER PURGE GAS

[75] Inventor: Eulas W. Henderson, Toledo, Ohio

[73] Assignee: Phillips Petroleum Company, Bartlesville, Okla.

[22] Filed: Apr. 27, 1973

[21] Appl. No.: 354,982

[52] U.S. Cl............................ 55/48, 55/68, 423/393
[51] Int. Cl............................................. B01d 53/14
[58] Field of Search............... 55/48, 49, 51, 68, 84, 55/93, 94, 223; 423/235, 393, 395

[56] References Cited
UNITED STATES PATENTS

| 2,028,402 | 1/1936 | Luscher | 423/393 |
| 2,088,057 | 7/1937 | Handforth | 423/393 |
| 3,425,803 | 2/1969 | Romeo | 423/393 |
| 3,428,424 | 2/1969 | Keith | 423/393 |

Primary Examiner—Charles N. Hart

[57] ABSTRACT

A combination of steps for removing nitrogen oxides from carbon black pellet dryer purge gas which, upon filtration, is scrubbed first with aqueous nitric acid solution and then with process water, the liquids being admixed, preferably, with aid of a jet venturi mixer and also in one modification the purge gas being heat interchanged with vent gas from at least one of the scrubbers to cool the purge gas before it is contacted with the scrubbing medium.

4 Claims, 1 Drawing Figure

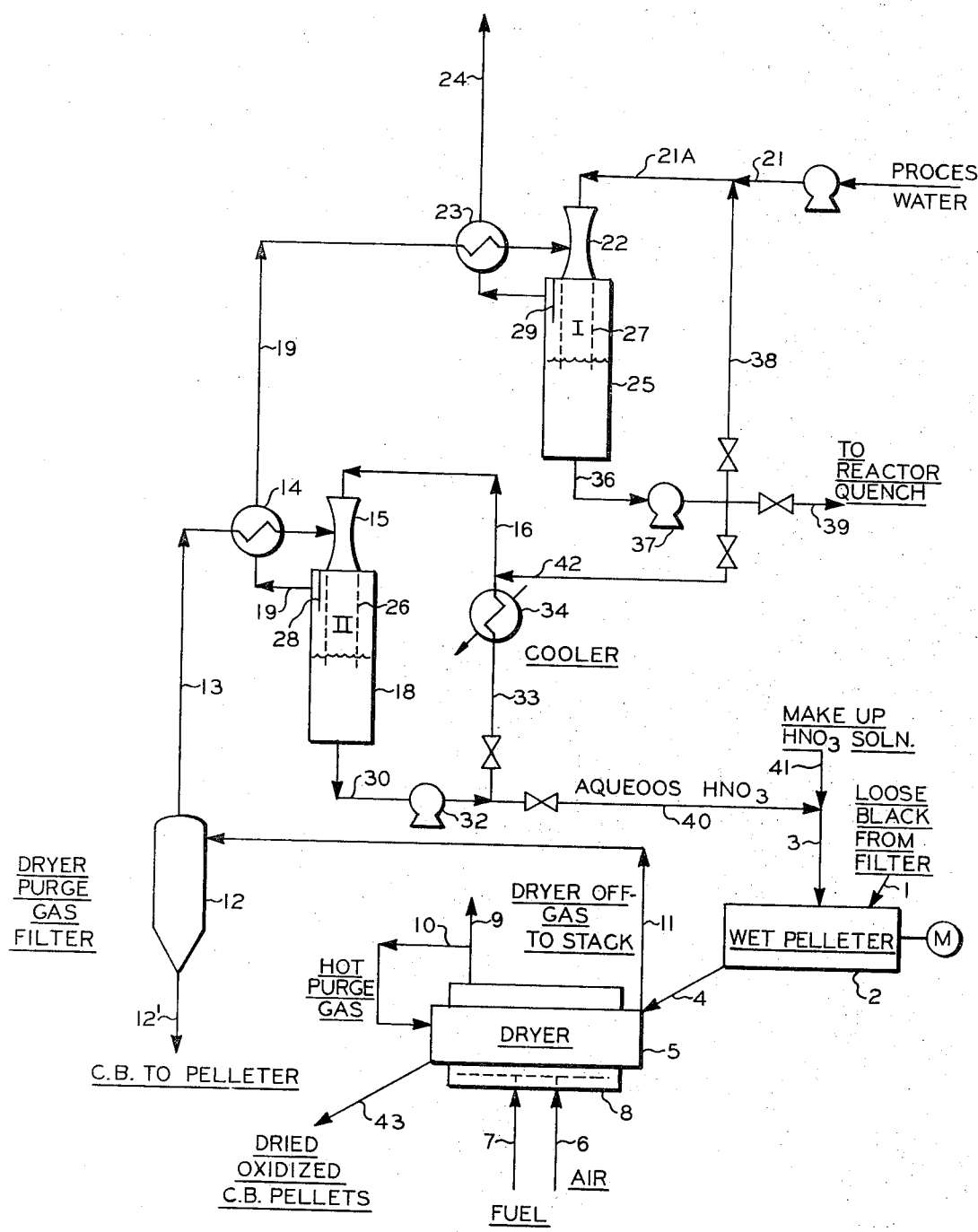

REMOVAL OF NITROGEN OXIDES FROM CARBON BLACK PELLET DRYER PURGE GAS

This invention relates to removal of nitrogen oxide from carbon black pellet dryer purge gas. In of its aspects, the invention relates to a combination of steps for removing nitrogen oxides from carbon black pellet dryer purge gas so that the gas can be vented to the atmosphere without causing pollution.

In one of its concepts, the invention provides a process wherein carbon black pellet dryer purge gas is successively scrubbed or washed to remove nitrogen oxides therefrom employing in a first scrubbing zone a dilute nitric acid and in a second process water and/or some dilute acid which, if employed, will contact the gases prior to the contact therewith of process water so that process water is the last scrubbing medium to contact the gases before these are vented to the atmosphere. In another of its concepts, the invention provides an operation in which the process water and/or aqueous nitric acid are contacted with the purge gas employing a jet venturi mixing zone to cause immediate intimate and thorough dissemination of the scrubbing medium and the purge gas each into the other. In still a further concept of the invention, it provides a modus operandi for operating the scrubbing zones at a desirable low temperature by heat interchanging vent gas from a scrubbing zone with the incoming purge gas. Further, still another concept of the invention provides the use of a cooler to cool the scrubbing medium to at least one of the scrubbing zones so as to cool gases therein thus providing cooled gases for heat interchange with the incoming purge gas.

Large tonnages of carbon black are used in many of the arts. Carbon black is used in all kinds of rubber including tire treads and other similar and widely differing applications. In the preparation of carbon black the bulk density as obtained is fairly low and it is customary to densify the carbon black. One way of doing this is to pelletize the carbon black. Carbon black is pelletized using pelletizing liquid which can be water and also this water can contain nitric acid which imparts desirable properties for certain use purposes to the pelleted black. Once the black has been pelleted, the wet pellets are passed to a dryer wherein the pellets are heated resulting in a dryer purge gas. Usually the gas is filtered as known in the art. This invention deals with the treatment of the purge gas.

I have now conceived of an improvement in a process for the removal of nitrogen oxides from carbon black pellet dryer purge gases. My improvement possesses several features. In one feature I employ a jet venturi mixer for admixing the scrubbing medium with the purge gas. Another feature relates to using the process water for the pelletizing as a final scrubbing medium for scrubbing the purge gas before it is vented to the atmosphere thus recovering nitrogen oxides therefrom following which this used process water now containing some nitrogen oxide is further used in the overall operation. A portion of this process water can be passed to the reactor quench in which carbon black just produced is quenched as known in the art. Another portion of the process water can be passed to the pelleting operation, but preferably is passed to a second scrubbing zone in which it is used to initially scrub the purge gas. Following said scrubbing the now twice used process water is used in the wet pelleter operation. Still another feature involves the heat exchanging of hot purge gas as it comes from the dryer, upon filtration, with vent gases from at least one of the scrubbing zones thus to permit the scrubbing zones to operate at a lower, more efficient temperature as one skilled in the art in possession of this disclosure will understand.

An object of this invention is to remove nitrogen oxides from carbon black pellet dryer purge gas. Another object of this invention is to more efficiently utilize process water which is used for pelleting as well as for reactor quench. A further object of the invention is to provide a combination of steps for removing nitrogen oxides from carbon black pellet dryer purge gas in a series of steps providing at least a part of the aqueous nitric acid which is used in the wet pelleting of the carbon black. A further object of the invention is to provide a process wherein the scrubbing zones are operated at a lower, more efficient temperature.

Other aspects, concepts, objects, and the several advantages of the invention are apparent from a study of this disclosure, the drawing and the appended claims.

According to the present invention there is provided a process for the removal of nitrogen oxide from carbon black pellet dryer purge gas which comprises in at least two scrubbing stages contacting such gases, preferably after the same have been filtered to remove carbon black therefrom, in reverse order of contact with process water to remove last traces of nitrogen oxides therefrom and then with a dilute nitric acid to remove substantial nitrogen oxides therefrom.

Also according to the invention the process water and/or the aqueous nitric acid are admixed with the purge gas using a jet venturi mixer, preferably directed downwardly into a gas disengaging vessel from which gases are vented at a top portion thereof.

Still further according to the invention the purge gases are heat interchanged with vent gases emanating from at least one of the scrubbing zones.

Referring now to the drawing, carbon black from filters operating upon smoke from carbon black reactors enters at 1 into wet pelleter 2 driven by motor M; to the wet pelleter there is also added at 3 a nitric acid solution and any other desired pelleting aid. The wet pellets produced in pelleter 2 pass by conduit 4 into dryer 5 which is heated in usual manner by air introduced at 6 and fuel introduced at 7 into combustion box 8 from which combustion gases leave at 9. At least a portion of these gases is passed by 10 into the dryer 5 resulting in a dryer purge gas 11 which is passed to dryer purge gas filter 12 and from there by 13 through heat exchanger 14 into jet venturi mixer 15 wherein the gas is admixed with dilute nitric acid solution 16. The details of the jet venturi mixing operation are well known in the art and need not be here summarized. Suffice to say that there is immediate intimate admixture of the gases and the solution.

The admixed purge gas and solution in this embodiment are directed downwardly with considerable force into scrubber 18 in which the gases disengage from liquid, the liquid collecting at the bottom and the gases leaving at the top portion of vessel 18 by 19, heat exchanger 14 for further treatment as later described.

According to the invention, the gases leaving at 19 which are considerably cooler than the gases moving in 13 on their way to jet venturi mixer 15 are heat interchanged at 14 and thus the gases in 13 are considerably cooled for more efficient mixing and more efficient nitrogen oxide removal. This results in considerably reducing the cost of the operation according to another feature of the invention in which the process water is introduced at 21 to jet venturi mixer 22 for admixture with the once scrubbed gases in 19. Depending upon conditions, it may be advantageous to provide a second heat exchanger 23 to cool further the gases in 19 before these admix in jet venturi mixer 22. The purge gas now substantially freed of its nitrogen oxide content is vented to the atmosphere at 24.

Returning now to the scrubber 18, its structure will be described. It will be understood that the structure of scrubber 25 can be identical or different as may be desired. In this embodiment the structures of the two scrubbers are substantially identical. However, the rates of flow of fluids in and from these vessels and their respective sizes are designed to take advantage of the more efficient operation provided by the invention as one skilled in the art in possession of this disclosure having read the same will understand.

In a variation of the embodiment described, downcomer pipes 26 and 27 are provided to guide the admixed fluids down into the surface and perhaps somewhat below the surface of the liquid settling in the bottom portions of the vessels 18 and 25. In the alternative, there can be provided by baffles or mist extractors as at 28 and 29 to remove any entrained liquid from the gases before these leave the respective vessels. Or, if desired, mist extractors alone can be used. Whether downcomer pipes and/or mist extractors or baffles are used, or for that matter any other equivalent device, will depend upon the positioning of the jet venturi mixers at 15 and 22. Although these mixers have been shown positioned directly atop vessels 18 and 25, they can be positioned elsewhere as will be understood by one skilled in the art in possession of this disclosure having studied the same. Specifically, the jet venturi mixers 15 and 22 can be positioned at one side of the top of the vessels 18 and 25 or even along the side thereof or at the bottom. The design of the vessels and positioning of the jet venturi mixers involve subordinate concepts of the invention. Their use in most economical and efficient manner is of prime importance.

Liquid is removed from the foot of scrubber vessel 18 at 30 and pumped by means of pump 32 and line 33 through an optionally provided fin cooler 34 and 16 to venturi mixer 15 for use as described. Liquid from the bottom of scrubber 25 is pumped from 36 by pump 37 and 38 to 21 and thence to jet venturi mixer 22 for use as previously described. A portion of the used process water in 38 is passed by 39 to the carbon black reactor quench (not shown).

Carbon black removed from dryer purge gas 11 in filter 12 is recovered at 12'.

Finally, aqueous nitric acid is passed by 40 into admixture with makeup nitric acid solution introduced at 41 and passes together therewith by 3 to the wet pelleter.

The used process water from the foot of vessel 25 is passed from pump 37 by 42 to 16 for use as already described.

The dried oxidized carbon black pellets as known in the art are removed from the dryer 5 at 43.

A portion of liquid 36 can be recycled to scrubber 25 via 38 to build up a desired level of nitrogen oxides therein (reported as $HNO_3$); a portion of solution 30 can be recycled via 33 to build up a desired level of nitrogen oxides therein (reported also as $HNO_3$).

It will be understood that the diagrammatic showing of the foregoing embodiment of the invention is made for illustrative purposes to describe the invention and to set forth the best mode now contemplated as required.

One skilled in the art in possession of this disclosure can considerably vary design details yet not depart from the scope thereof.

To more fully describe the several features and embodiment of the features of the invention herein described the following information is presented.

TYPICAL OPERATION

A. Stream Flow

| Conduit Number | Description of Stream | | Flow Rate |
|---|---|---|---|
| 41 | Makeup Nitric Acid (67.5[a] Wt. % $HNO_3$), | lbs./hr | 79[g] |
| 1 | Flocculent Carbon Black, | lbs./hr | 5,000 |
| 3 | Aqueous Solution (7.8[b] Wt. % $HNO_3$), | lbs./hr | 3,560 |
| 4 | Wet Pellets at 180° F, | lbs./hr | 8,560 |
| 43 | Dried Pellets at 500° F, | lbs./hr | 5,000 |
| 10 | Purge Gas at 300° F, | SCF/hr | 102,780 |
| 11 | Wet Purge Gas at 450° F, | SCF/hr | 175,000 |
| | Wet Purge Gas Contains: | | |
| | Nitrogen Oxides, as $NO_2$, | lbs./hr | 136 |
| | Water, | lbs./hr | 3,876 |
| | Carbon Black, | lbs./hr | 351 |
| 12' | Carbon Black Recycled to Pelleter, | lbs./hr | 350[c] |
| 13 | Gas to Contactor 18 | SCF/hr | 175,000 |
| | Gas Contains: | | |
| | Nitrogen Oxides, as $NO_2$, | lbs./hr | 136 |
| | Water, | lbs./hr | 3,876 |
| | Carbon Black, | lbs./hr | 1 |
| 16 | Aqueous $HNO_3$[h] (7.7 Wt. % $HNO_3$), | lbs./hr | 8,600 |
| 19 | First Stage Gas at 250° F[d] | SCF/hr | 124,500 |
| | Gas Contains: | | |
| | Nitrogen Oxides, as $NO_2$ | lbs./hr | 23 |
| | Water, | lbs./hr | 1,556[e] |
| 21A | Dilute Aqueous $HNO_3$[h] (1.46 Wt.% $HNO_3$), | lbs./hr | 3,956 |
| 24 | Off-Gas at 250° F, | SCF/hr | 124,400 |
| | Gas Contains: | | |
| | Nitrogen Oxides, as $NO_2$ | lbs./hr | 3 |
| | Water | lbs./hr | 1,556 |
| 42 | Makeup Aqueous Solution for 18 | lbs./hr | 989 |

TYPICAL OPERATION -Continued

A. Stream Flow

| Conduit Number | Description of Stream | | Flow Rate |
|---|---|---|---|
| 21 | Process Water for 25 | lbs./hr | 975$^f$ |
| 39 | To Reactor Quench (in this operation) | lbs./hr | 0 |
| 40 | Recycle Aqueous HNO$_3$, Contains: | lbs./hr | 3,481 |
| | HNO$_3$ | lbs./hr | 222 |
| | Water, | lbs./hr | 3,259 |

B. Operating Conditions

| Unit | Temperature, °F | Pressure, Psia |
|---|---|---|
| Wet Pelleter | 215 | 14.7 |
| Dryer | 500 | 14.7 |
| Contactor 18 | 170 | 17 |
| Contactor 25 | 250 | 15.5 | a — 43° Baume' acid.
b — 5.5 weight percent on dry carbon black basis.
c — 99.8 weight percent recovery of carbon black.
d — After heat exchange with line 17.
e — 60 weight percent of water in line 17 is condensed before gas exits via 19.
f — This is only 30 percent of new water in "conventional" operation.
g — This is 19 percent of "conventional" acid requirement.
h — Recovered nitrogen oxides, expressed as HNO$_3$.

The foregoing typical operation is based upon knowledge in the art, knowledge of earlier obtained data and experience in the field and some engineering calculations and estimates.

Reasonable variation and modification are possible within the scope of the foregoing disclosure, drawing and the appended claims to the invention the essence of which is that there have been provided several improvements in the removal of nitrogen oxides from carbon black pellet dryer purge gas notably heat interchange of the purge gas with scrubbed gas to cool the same, jet venturi admixing of scrubbing medium and purge gas and also, importantly, the use of process water which ultimately is used as reactor quench and/or as pelletizing medium initially as scrubbing medium to remove last amounts of nitrogen oxide from at least one scrubbed purge gas substantially as described.

I claim:

1. A process for the removal of nitrogen oxides from carbon black pellet dryer purge gas which comprises contacting said gas with an aqueous nitric acid solution thus removing nitrogen oxides therefrom, then contacting the thus treated gases with process water to be used ultimately as reactor quench and/or pelleting medium to remove last amounts of nitrogen oxides therefrom thus obtaining in the two contacting steps with use of the process water as described the aqueous nitric acid for use as described and for later use as pelleting medium.

2. A process according to claim 1 wherein at least one of the process water and the aqueous nitric acid used to contact the purge gas is admixed therewith with the aid of a jet venturi mixer.

3. A process according to claim 1 wherein the hot purge gas is heat interchanged with cooler scrubbed purge gas before the purge gas is passed to the scrubbing step.

4. A process according to claim 1 wherein process water is circulated through a last scrubbing zone to scrub nitrogen oxides from the purge gas which has been once treated with a scrubbing medium until a sufficient concentration of nitric acid has been attained and then passing at least a portion of the thus acidified process water to a first scrubbing zone wherein it is contacted with the purge gas and there used until its concentration has reached a level at which it is advantageously used for wet pelleting of carbon black.

* * * * *